(12) United States Patent
Iguchi

(10) Patent No.: US 7,443,068 B2
(45) Date of Patent: Oct. 28, 2008

(54) SPINDLE MOTOR

(75) Inventor: Takuro Iguchi, Kyoto (JP)

(73) Assignee: Nidec Corporation, Kyoto (JP)

( * ) Notice: Subject to any disclaimer, the term of this patent is extended or adjusted under 35 U.S.C. 154(b) by 446 days.

(21) Appl. No.: 11/367,648

(22) Filed: Mar. 3, 2006

(65) Prior Publication Data

US 2006/0197395 A1 Sep. 7, 2006

(30) Foreign Application Priority Data

Mar. 3, 2005 (JP) ............................. 2005-059122

(51) Int. Cl.
*H02K 21/12* (2006.01)
(52) U.S. Cl. .............................. 310/156.26; 310/156.43
(58) Field of Classification Search ............ 310/156.08, 310/156.12, 156.13, 156.15, 156.26, 156.43
See application file for complete search history.

(56) References Cited

U.S. PATENT DOCUMENTS

| | | | | |
|---|---|---|---|---|
| 5,093,595 | A | * | 3/1992 | Korbel ................. 310/156.43 |
| 5,539,188 | A | * | 7/1996 | Fallah et al. ................. 235/375 |
| 5,661,352 | A | * | 8/1997 | Oguchi et al. ................. 310/71 |
| 5,880,543 | A | * | 3/1999 | Park ......................... 310/67 R |
| 6,018,438 | A | * | 1/2000 | Nottingham et al. ...... 360/98.07 |
| 6,057,616 | A | * | 5/2000 | Pelstring ..................... 310/71 |
| 6,486,578 | B2 | | 11/2002 | Kitahori et al. |
| 6,841,902 | B2 | * | 1/2005 | Wang et al. ............... 310/67 R |
| 6,876,114 | B2 | * | 4/2005 | Knotts et al. ........... 310/156.26 |
| 7,190,549 | B2 | * | 3/2007 | Byun et al. ............. 360/99.08 |
| 2006/0197395 | A1 | * | 9/2006 | Iguchi .................. 310/156.43 |
| 2006/0208723 | A1 | * | 9/2006 | Iguchi ........................ 324/200 |
| 2007/0127156 | A1 | * | 6/2007 | Byun et al. ............. 360/99.08 |

FOREIGN PATENT DOCUMENTS

WO WO 00/62404 10/2000

* cited by examiner

*Primary Examiner*—James Harvey
(74) *Attorney, Agent, or Firm*—Keating & Bennett, LLP

(57) ABSTRACT

A spindle motor includes a rotor magnet including a plurality of pairs of magnetic poles polarized in a radial direction and arranged along a circumferential direction of the rotor magnet and a rotor hub supporting the rotor magnet and being rotatable around an axis of the circular shape of the rotor magnet. A circular surface in the form of a convex portion is provided on a magnetic shield portion of the rotor hub and is arranged to oppose one axial end surface of the rotor magnet and abut against the rotor magnet such that a gap is provided between the axial end surface of the rotor magnet and the circular surface of rotor hub.

24 Claims, 11 Drawing Sheets

SPINDLE MOTOR

BACKGROUND OF THE INVENTION

1. Field of the Invention

The present invention generally relates to a spindle motor and more particularly relates to a spindle motor for rotating a disk-shaped storage medium, such as magnetic disks, typified by hard disks; various types of optical disks; and magnetic optical disks.

2. Description of the Related Art

Recently, hard disk drive devices are being installed in mobile devices. These mobile devices are battery-powered, and in order to ensure longer battery operating time, the spindle motors (hereinafter referred to as motors) used in the hard disk drive devices are required to have severely low power consumption.

FIGS. 10 and 11 are sectional views of conventional motors. In the conventional motors shown in FIG. 10 and 11, the circular rotor magnet 2 is fixed to a lower side and in a radially-outward portion of the rotor hub 1. In addition, the rotor magnet 2 opposes the stator 3 with a gap maintained between the rotor magnet 2 and the stator 3 in the radially-outward direction of the rotor magnet 2.

The rotor hub 1 of the conventional motor shown in FIG. 10 includes a circular magnetic shield portion 1a made of a ferromagnetic material. The magnetic shield portion 1a is a circular surface provided on the bottom (rotor magnet side) surface of the rotor hub 1, when viewed from the rotor magnet 2 side, and covers the upper surface (the surface on a side near the magnetic disk) of the rotor magnet 2. This arrangement prevents the magnetic flux generated by the rotor magnet 2 from damaging the data stored on the magnetic disks and allows magnetic flux to flow smoothly from the rotor magnet 2 to the stator 3.

In the conventional motor shown in FIG. 10, the upper surface of the rotor magnet 2 abuts the bottom surface of the magnetic shield portion 1a, and the magnetic field short-circuits at the abutted portion, forming another magnetic circuit therebetween. Therefore, the magnetic flux, which flows into stator 3, decreases. As a result, the conventional motor generates less torque, requires more magnetizing current, and increases the power consumption.

In order to prevent the short-circuiting explained above, a gap may be provided between the upper surface of the rotor magnet 2 and the bottom surface of the magnetic shield portion 1b of the conventional motor shown in FIG. 11. However, providing this gap makes it difficult to accurately axially position the rotor magnet 2. Accurate axial positioning of the rotor magnet 2 has a substantial influence on the performance of motors used in mobile devices, particularly on the performance of motors whose axial direction thickness is 10 mm or less.

SUMMARY OF THE INVENTION

In order to overcome the problems described above, the preferred embodiments of the present invention achieve one or more of the following advantages: easy axial positioning of the rotor magnet in relation to the rotor hub during the production process; minimized short-circuiting of the magnetic field; and relatively low power consumption of the motor. These properties are especially advantageous for small and thin motors, which are difficult to assemble and which require severely reducing the power consumption.

In various preferred embodiments of the present invention, the upper surface of the rotor magnet does not fully contact the circular surface of the magnetic shield portion so that the properties and advantages mentioned above may be achieved. For example, a convex portion may be provided on the circular surface of the magnetic shield portion or on the upper surface of the rotor magnet, and the circular surface and the upper surface contact only via the convex portion.

A contact position, where the circular surface and the shield portion contact, may be spaced away from high magnetic flux density areas, such as the outer circumference and the inner circumference of the rotor magnet. Therefore, the contact position may be set at approximately the center of the radial thickness of the rotor magnet. Alternatively, the contact position may be set at approximately the bounding portions between magnetic poles arranged around the approximate radially-center position of the rotor magnet. With this arrangement, short-circuiting of the magnetic field from the rotor magnet into the magnetic shield portion is relatively minimized. Therefore, the magnetic flux is used highly effectively. In addition, the rotor magnet abuts the magnetic shield portion, which makes axial positioning of the rotor magnet easier during the production process.

In the preferred embodiments of the present invention, less magnetic flux from the rotor magnet flows into the rotor hub near the outer circumference portion of the rotor magnet, which opposes the stator. In addition, less magnetic flux from the rotor magnet flows into the rotor hub near the inner circumference portion of the rotor magnet. In an inner rotor spindle motor, the stator is not provided on the inner circumference side of the rotor magnet. However, it is less likely that magnetic flux flows into the rotor hub at the inner circumference side of the rotor magnet, and the magnetic resistance of the magnetic circuit from the inner circumferential magnetic pole to the outer circumferential magnetic pole through the rotor hub is increased. Therefore, the magnetic field short-circuited through this magnetic circuit is decreased.

The bounding portions between magnetic poles are also arranged in the circumferential direction of the rotor magnet, and the properties described above may be attained by setting the contact position at approximately these bounding portions.

The preferred embodiments of the present invention where the motor is an inner rotor spindle motor are discussed above. The scope of the present invention also includes a modification of the preferred embodiments of the present invention where the motor is an outer rotor spindle motor, in which the rotor magnet is located near a radially-outward portion of the stator. In the modification of the preferred embodiments of the present invention, properties described above may also be attained.

Moreover, the motor of the preferred embodiments of the present invention allows the hard disk drive devices to be small and to have low power consumption.

Other features, elements, advantages and characteristics of the present invention will become more apparent from the following detailed description of preferred embodiments thereof with reference to the attached drawings.

DETAILED DESCRIPTION OF THE PREFERRED EMBODIMENTS

The preferred embodiments of the present invention are shown with reference to FIGS. 1 to 9.

Figure 1:
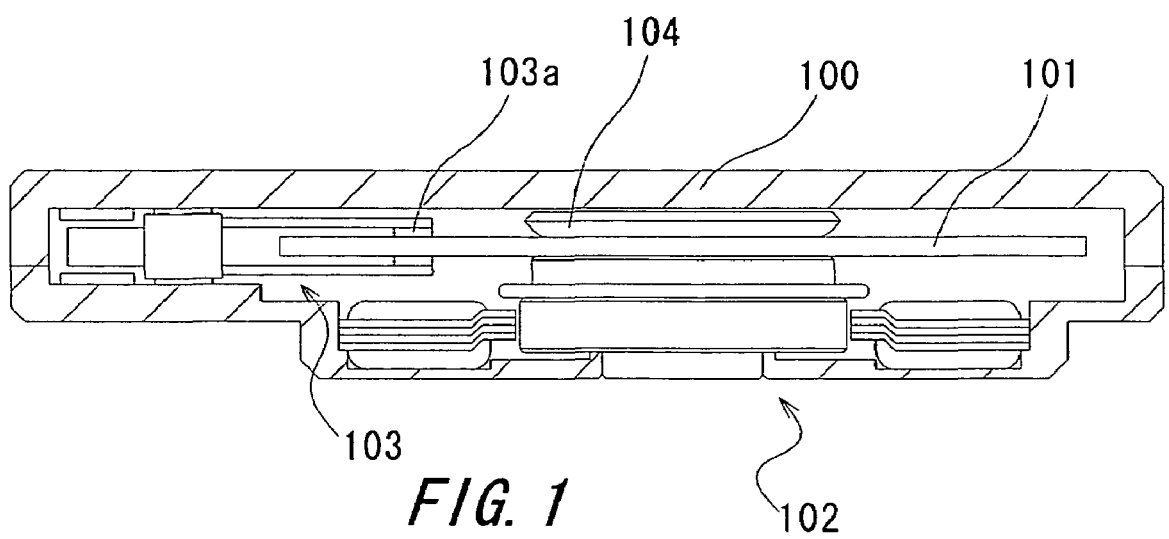
FIG. 1 is a schematic cross sectional view of a hard disk drive device using a motor according to various preferred embodiments of the present invention.
Figure 2:
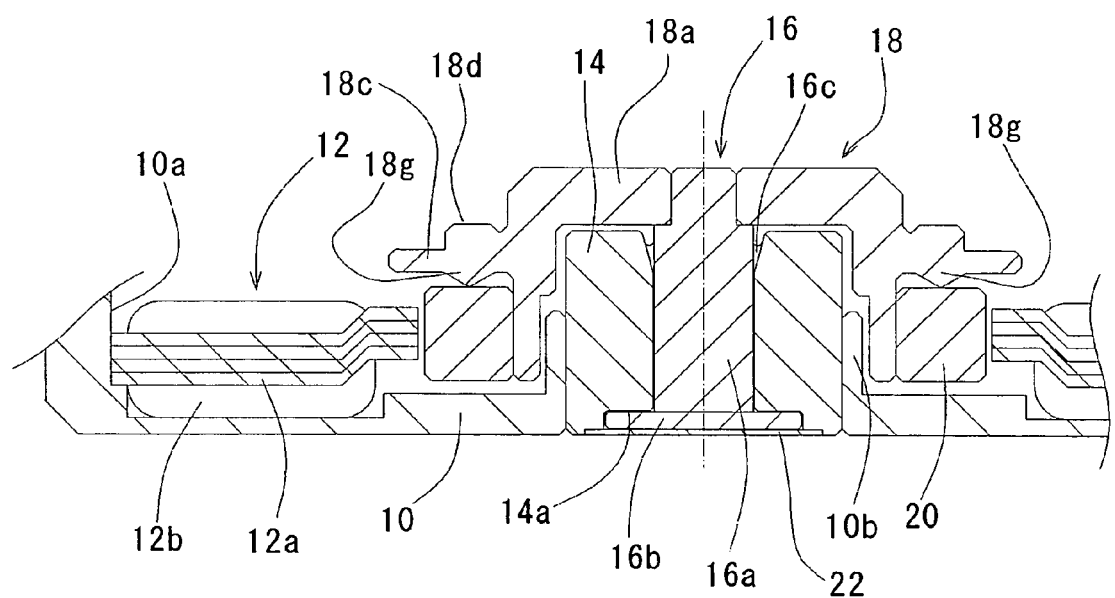
FIG. 2 is a schematic cross sectional view of a substantial part of a motor according to the first preferred embodiment of the present invention.
Figure 3:
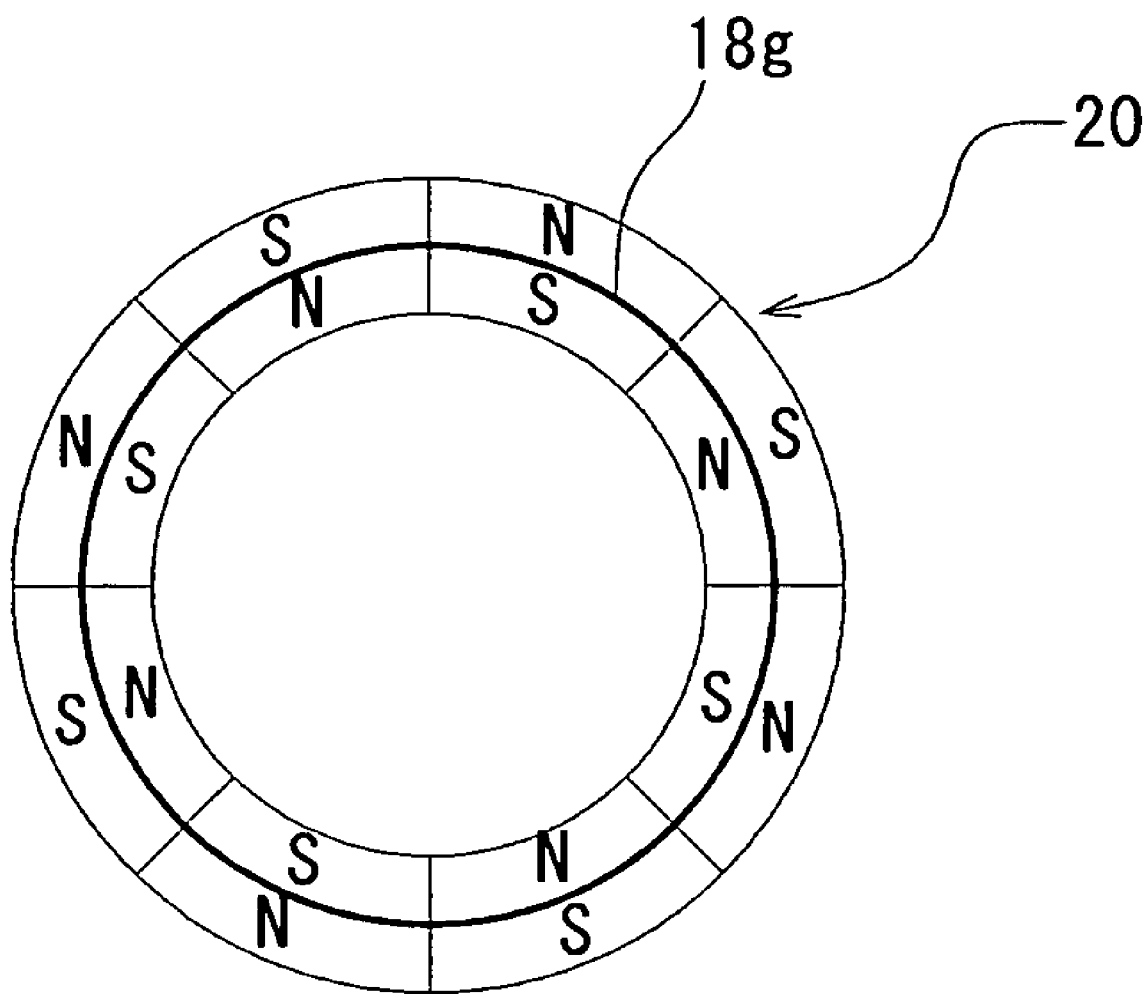
FIG. 3 is a plain view of a rotor magnet according to the first preferred embodiment of the present invention.

FIGS. 1 to 3 illustrate the first preferred embodiment of the present invention. FIG. 1 is a cross sectional view of a hard disk drive device in which a spindle motor according to one preferred embodiment of the present invention is installed. FIG. 2 is a schematic cross sectional view of a substantial part of the motor according to the first preferred embodiment of the present invention. FIG. 3 is a plain view of the rotor magnet according to the first preferred embodiment of the present invention.

Referring now to FIG. 1, the hard disk drive device includes: a motor 102; a hard disk 101, e.g., a magnetic disk, fixed to the motor 102; a magnetic head 103a which reads and writes data; an actuator 103 which allows the magnetic head 103a to move in the radial direction; and a case 100 which encloses the above components. The magnetic head 103a is installed on both the upper and lower sides of the hard disk 101 which is rotated by the motor 102.

Referring to FIG. 2, the motor includes: a base 10; a stator 12, formed by winding stator coil 12b around a stator core 12a; a sleeve bearing 14; a rotation axial section 16 including an axial portion 16a and a thrust circular plate portion 16b; a rotor hub 18; and a circular rotor magnet 20.

A circular concave portion 10a having an upper opening is provided on the base 10, and the bearing support cylinder portion 10b is arranged in an upwardly protruding manner at the center of the convex portion 10a.

The stator core 12a is fixed to an outer circumferential wall portion of the inside of the circular concave portion 10a. The sleeve bearing 14 is fitted into the bearing support cylinder portion 10b. The stator core 12a and the sleeve bearing 14 are coaxially arranged.

The rotor hub 18 is made of a ferromagnetic material. The upper portion of the rotor hub 18 includes an upper plate portion 18a so as to form an occluded cylinder shape. A magnetic shield portion 18c is provided at the axially-middle position of the outer circumferential side of the rotor hub 18. In addition, the magnetic shield portion 18c has a circular shape and protrudes in the radially-outward direction from the rotor hub 18. The magnetic shield portion 18c does not have to be located exactly at the axially center position of the rotor hub 18.

A hard disk support portion 18d (recording disk support portion), which is circular and which is thicker than the radially-outward portion of the magnetic shield portion 18c, is provided on the upper side and in a radially-inward portion of the magnetic shield portion 18c. A hard disk 101 (see FIG. 1) is placed on the hard disk support portion 18d and is fixed by damper 104 while supported on the hard disk support portion 18d.

A convex portion 18g is provided on the lower side and in a radially-inward portion of the magnetic shield portion 18c. The convex portion 18g has a circular shape whose axis is coaxial with the axis of the rotor hub 18 and protrudes downwardly from the magnetic shield portion 18c. The cross-section of the convex portion 18g preferably has a substantially triangular shape whose base is located adjacent to the magnetic shield portion 18c.

A fitting bore is provided on the upper plate portion 18a of the rotor hub 18. The axial portion 16a of the rotation axial section 16 is provided in the fitting bore such that the rotor hub 18 and the rotation axial section 16 are coaxially arranged. The axial portion 16a of the rotation axial section 16 is provided in the sleeve bearing 14 and rotatably supported by lubricant oil 16c. A thrust circular concave portion 14a is provided at the bottom of the inner circumferential side of the sleeve bearing 14. The lower side of the thrust circular concave portion 14a is occluded by the thrust circular plate 22. A thrust circular plate portion 16b located at the bottom of the rotation axial section 16 is inserted into the thrust circular concave portion 14a so as to be supported axially by a circular surface of the thrust circular concave portion 14a and by an upper surface of the thrust circular plate 22 through lubricant oil 16c.

The circular rotor magnet 20, which is magnetized in the radial direction, is fixed, for example by adhesives or other suitable material, to the lower surface of the magnetic shield portion 18c, which is a part of the outer circumferential portion of the rotor hub 18, so as to form a rotor. As shown in FIG. 3, both the outer and inner circumferential surfaces of the rotor magnet 20 include four north poles and four south poles, where these magnetic poles are aligned one after another in the circumferential direction. The outer circumferential surface of the rotor magnet 20 opposes the inner circumferential surface of the stator core 12a in the radial direction. An outer diameter of the magnetic shield portion 18c is bigger than the diameter of the rotor magnet 20 to ensure the effectiveness of the magnetic shield effect and to prevent the rotor magnet 20 from influencing the positions above the magnetic shield portion 18c.

The circular bottom of the convex portion 18g of the magnetic shield portion 18c abuts against a bounding portion of the rotor magnet 20, i.e., the portion of the rotor magnet 20 radially between the north pole and the south pole at the upper surface of the rotor magnet 20. The magnetic flux leakage of the upper surface of the rotor magnet 20 is a minimum at the point which is, for example, about 4.2 mm from the rotation axis of the rotor magnet whose dimensions are about 1.5 mm axial height, about 3.5 mm inside radius, and about 4.75 mm outside radius. Therefore, in this example of the present preferred embodiment, the radius of the convex portion 18g is preferably set at approximately 4.2 mm at its bottom end, and the portion on the upper surface of the rotor magnet 20 which is spaced about 4.2 mm away from the rotation axis of the rotor magnet 20 (the bounding portion of the rotor magnet 20 between the magnetic poles in the radius direction) abuts against the end portion of convex portion 18g. The bounding portion of the rotor magnet 20 between the magnetic poles defined here is the portion where the magnetic flux leakage of the upper surface of the rotor magnet 20 is a minimum. The end portion of the convex portion 18g has a predetermined thickness, and it is not necessary that the end portion of the convex portion 18g be pointed. In at least one preferred embodiment of the present invention, the portion of the rotor magnet 20 abutting the end portion of the convex portion 18g may at least include the bounding portion.

With this unique arrangement, the magnetic flux generated by the rotor magnet 20 may be prevented from flowing into the magnetic shield portion 18c through the convex portion 18g. As a result, the increase in the power consumption caused by the massive flow of the magnetic flux from the rotor magnet 20 into the magnetic shield portion 18c is reliably prevented. Further, the rotor magnet 20 may be axially positioned with great accuracy.

Figure 4:
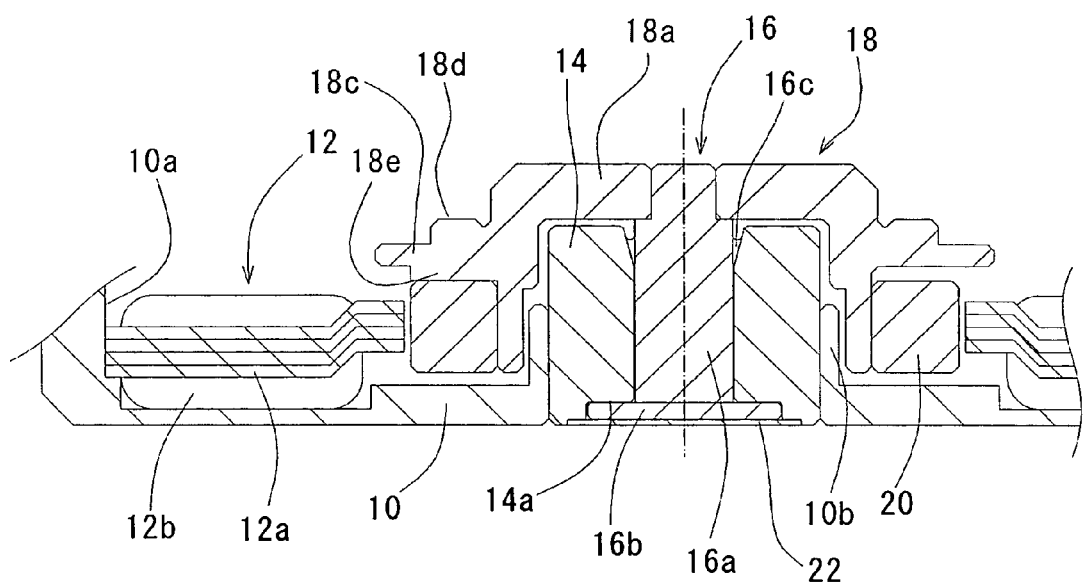
FIG. 4 is a schematic cross sectional view of a substantial part of a motor according to the second preferred embodiment of the present invention.
Figure 5:
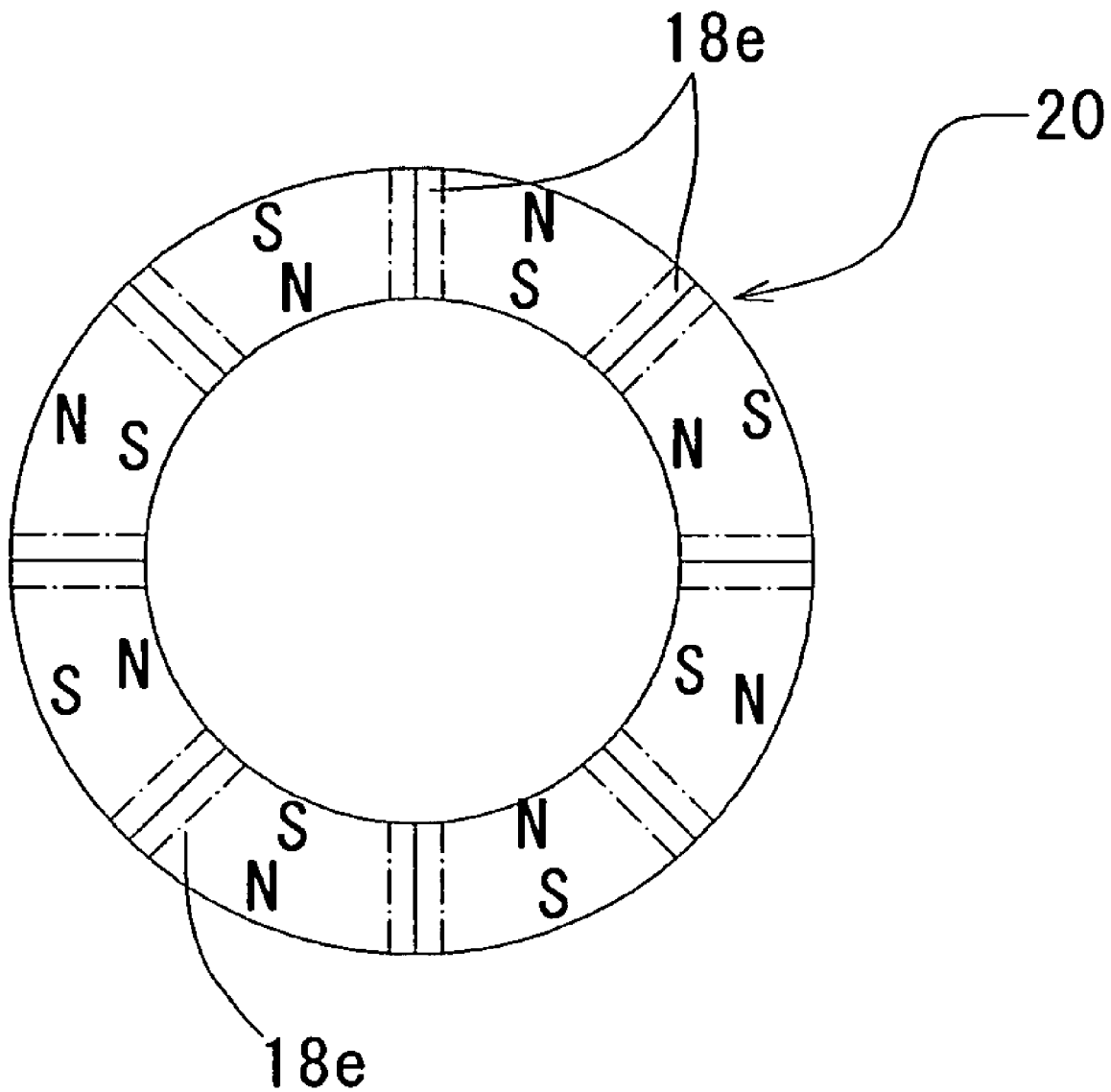
FIG. 5 is a plain view of a rotor magnet according to the second preferred embodiment of the present invention.

FIGS. 4 and 5 show the second preferred embodiment of the present invention. FIG. 4 is a schematic cross sectional view of a motor according to the second preferred embodiment of the present invention. FIG. 5 is a plain view of a rotor magnet according to the second preferred embodiment of the present invention. Detailed explanation of the reference letters and numerals used in FIGS. 4 and 5 that are identical to the reference letters and numerals used in FIGS. 1 and 3 will be omitted because they refer to similar structures.

As shown in FIG. 4, eight convex portions 18e, which downwardly protrude from the magnetic shield portion 18c and which extend in a radial direction from the rotor hub 18, are provided in a radially-inward portion on the lower side of the magnetic shield portion 18c. In addition, the convex portions 18e are aligned in a rotationally symmetric manner around the axis of the rotor hub 18.

As shown in FIG. 5, the bottom of each convex portion 18e abuts against a portion of the rotor magnet 20 which is the central-angle portion that separates adjacent magnetic poles in the circumferential direction on the upper surface of the rotor magnet 20, i.e., the radially extending portions between adjacent magnetic poles on the upper surface of the rotor magnet 20. With this arrangement, the magnetic field of the rotor magnet 20 may be prevented from flowing into the magnetic shield portion 18c through the convex portion 18e. As a result, the increase in the power consumption caused by the massive flow of magnetic flux from the rotor magnet 20 into the magnetic shield portion 18c may be avoided. Further, the rotor magnet 20 may be axially positioned with great accuracy.

Figure 6:
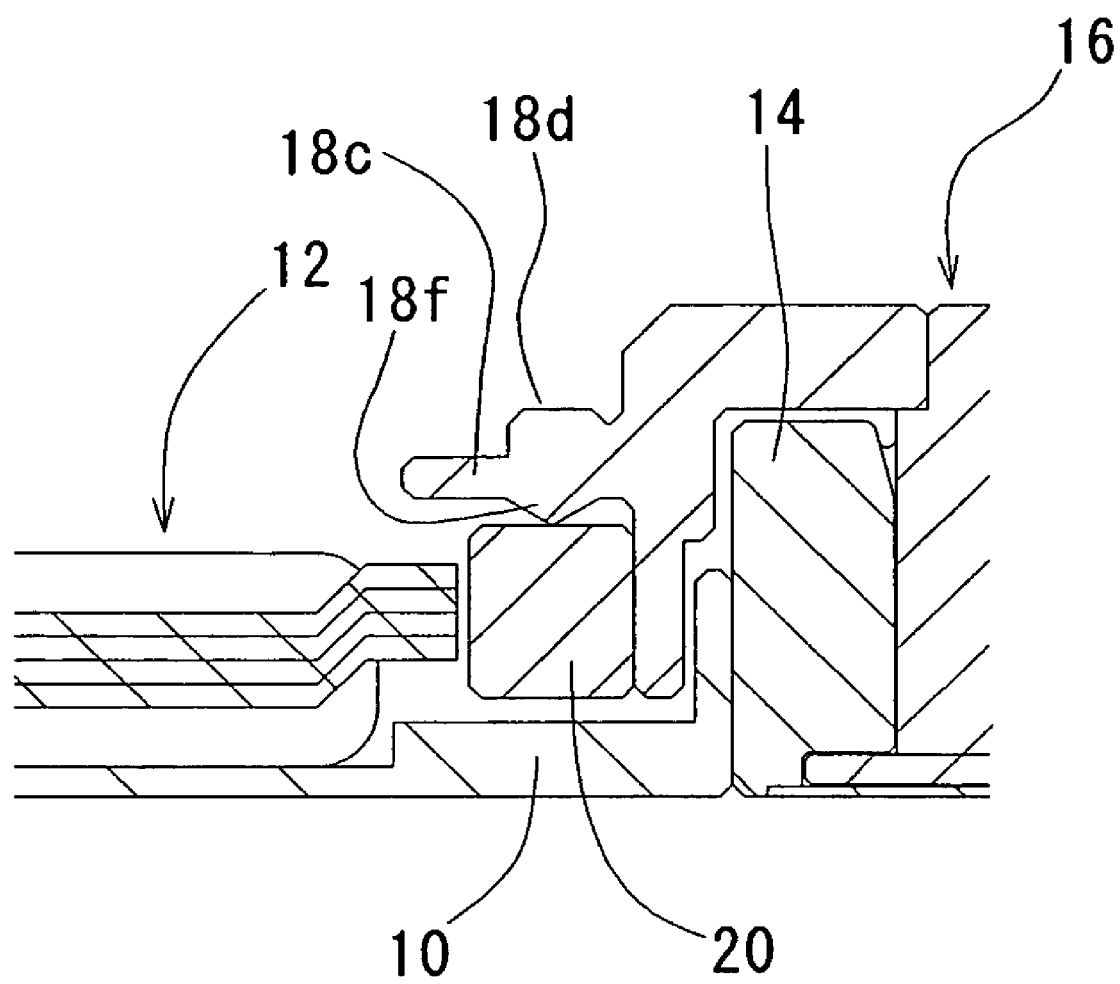
FIG. 6 is a schematic cross sectional view of a substantial part of a motor according to the third preferred embodiment of the present invention.
Figure 7:
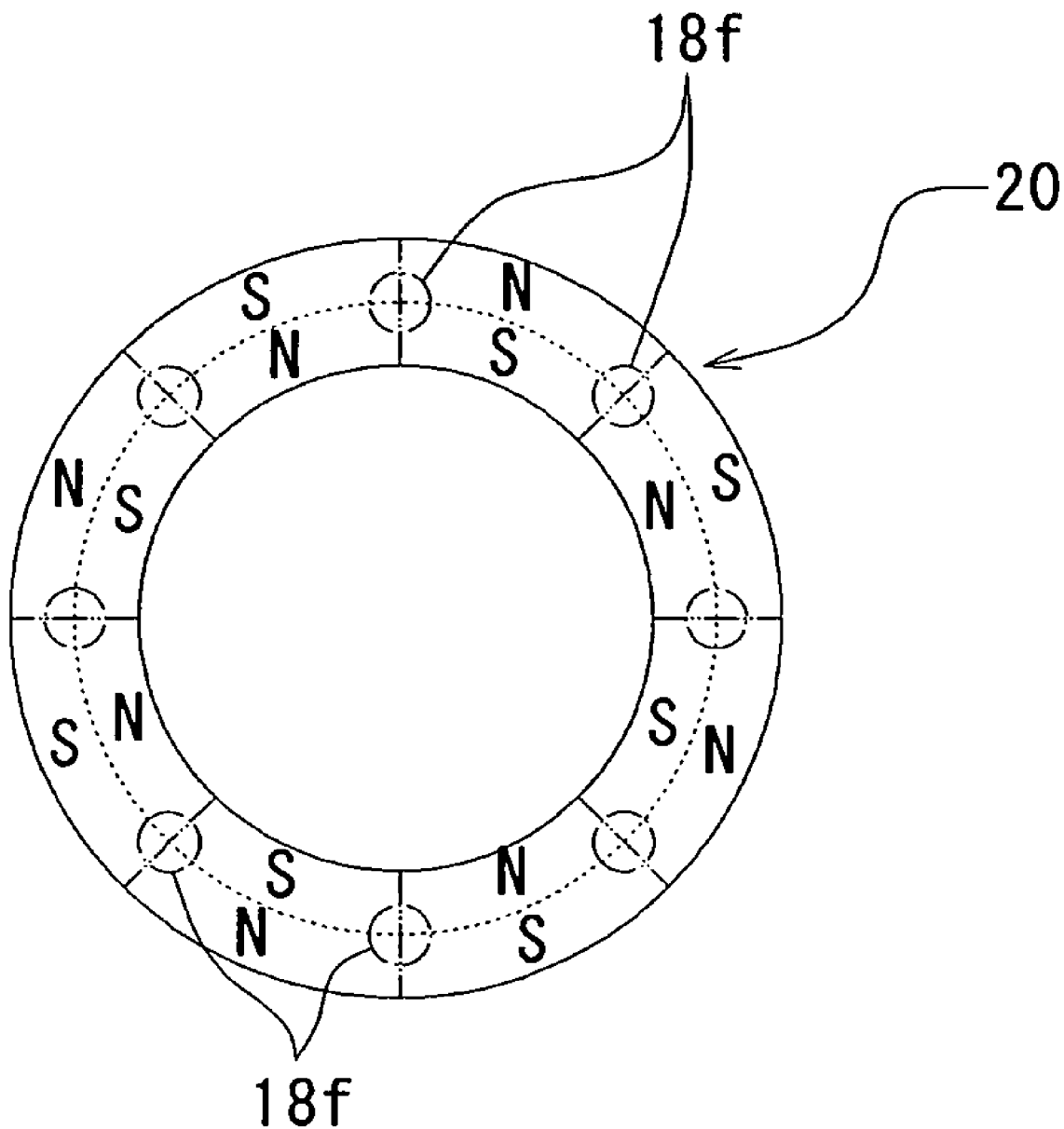
FIG. 7 is a plain view of a rotor magnet according to the third preferred embodiment of the present invention.

FIGS. 6 and 7 show the third preferred embodiment of the present invention. FIG. 6 is a schematic cross sectional view of a motor according to the third preferred embodiment of the present invention. FIG. 7 is a plain view of a rotor magnet according to the third preferred embodiment of the present invention. Detailed explanation of the reference letters and numerals used in FIGS. 6 and 7 that are identical to the reference letters and numerals used in FIGS. 1 and 3 will be omitted because they refer to similar structures.

As shown in FIG. 6, eight convex portions 18f, which preferably have a circular cone shape that protrudes downwardly, are provided on a radially-inward portion on the lower side of the magnetic shield portion 18c. In addition, the convex portions 18f are aligned in a rotationally symmetric manner around the axis of the rotor hub 18.

As shown in FIG. 7, the bottom of the convex portion 18f abuts against a bounding portion. The bounding portion in this preferred embodiment is the central-angle portion that separates adjacent magnetic poles of the rotor magnet 20 in the circumferential direction and that separates the north pole and the south pole of the rotor magnet 20 in the radial direction on the upper surface of the rotor magnet 20. With this arrangement, the magnetic field of the rotor magnet 20 may be prevented from flowing into the magnetic shield portion 18c through the convex portion 18f. As a result, the increase in the power consumption caused by the massive flow of magnetic field from the rotor magnet 20 into the magnetic shield portion 18c may be avoided. Further, the rotor magnet 20 may be axially positioned with great accuracy.

Figure 8:
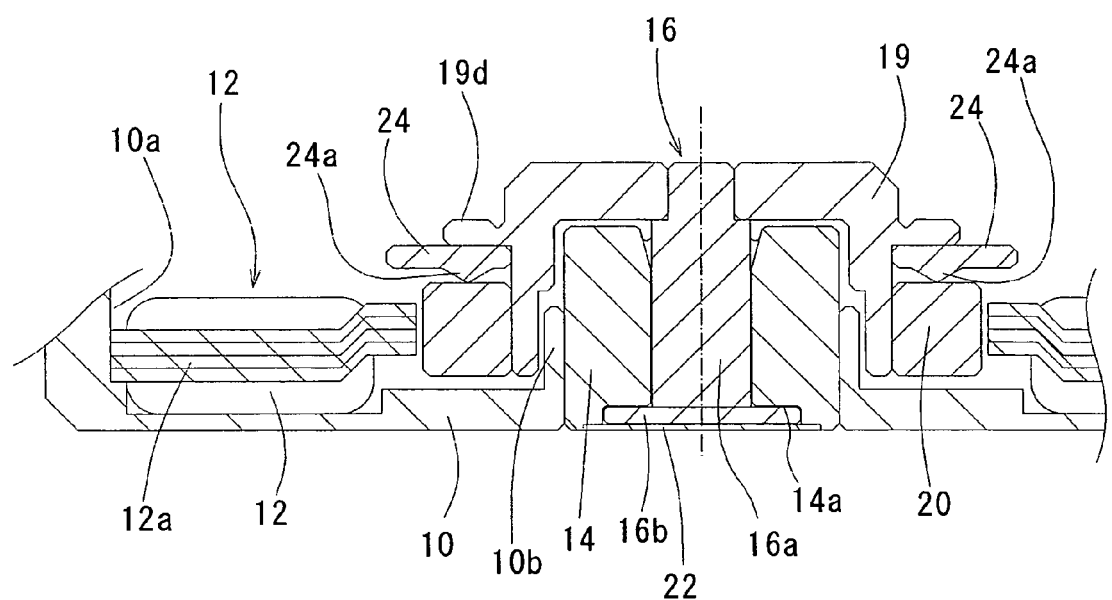
FIG. 8 is a schematic cross sectional view of a substantial part of a motor according to the fourth preferred embodiment of the present invention.
Figure 9:
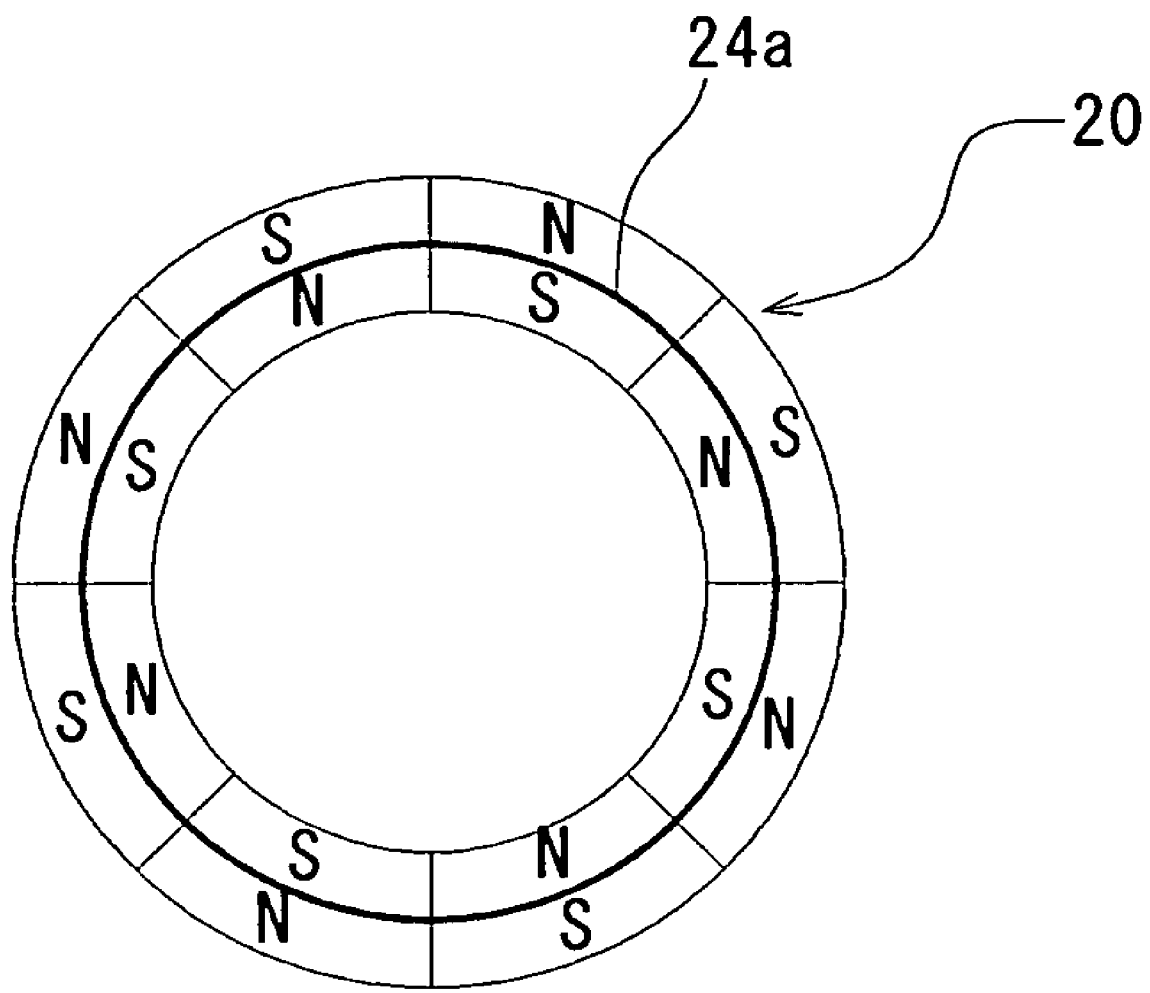
FIG. 9 is a plain view of a rotor magnet according to the fourth preferred embodiment of the present invention.
Figure 10:
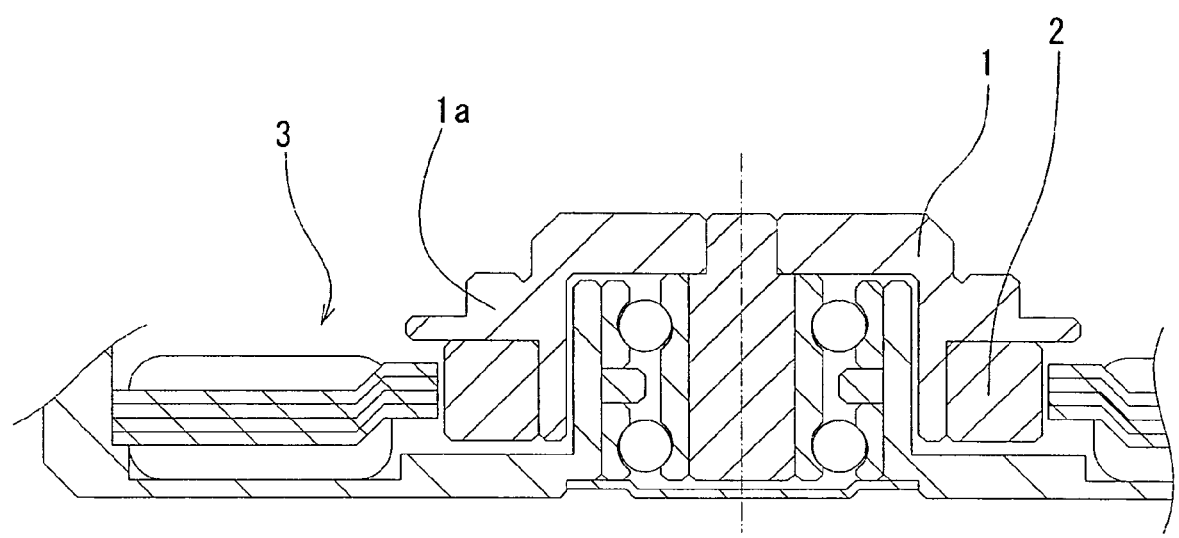
FIG. 10 is a schematic cross sectional view of a conventional spindle motor.
Figure 11:
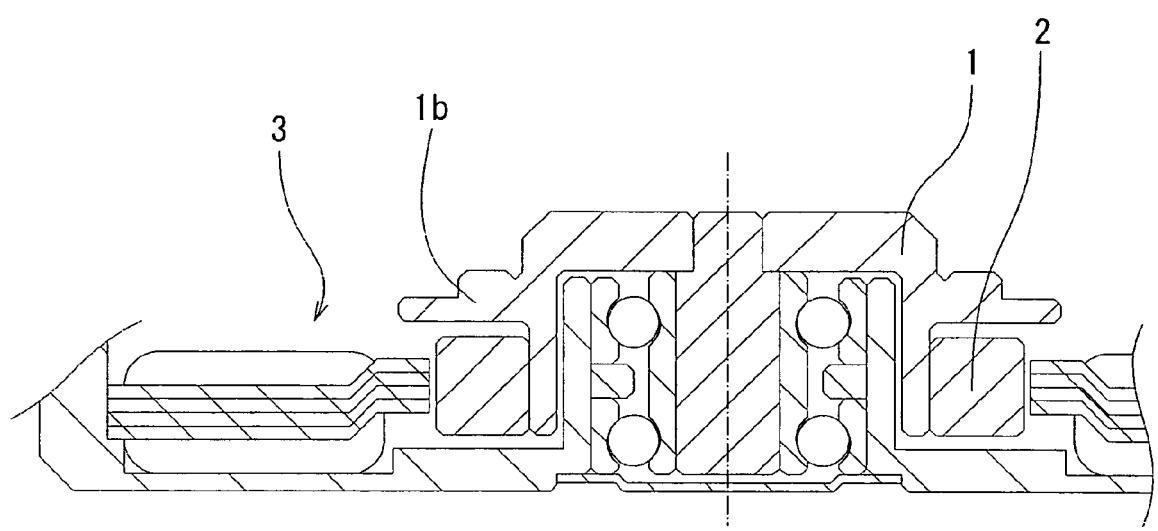
FIG. 11 is a schematic cross sectional view of a conventional spindle motor.

FIGS. 8 and 9 show the fourth preferred embodiment of the present invention. FIG. 8 is a schematic cross sectional view of a motor according to the fourth preferred embodiment of the present invention. FIG. 9 is a plain view of a rotor magnet according to the fourth preferred embodiment of the present invention. Detailed explanation of the reference letters and numerals used in FIGS. 8 and 9 that are identical to the reference letters and numerals used in FIGS. 1 and 3 will be omitted because they refer to similar structures.

Referring now to FIG. 8, a rotor hub 19 is preferably made of a non-ferromagnetic material. Unlike the rotor hub 18 shown in FIG. 2, the rotor hub 19 does not include the magnetic shield portion 18c and instead includes a hard disk support portion 19d (a recording disk support portion) that protrudes in the radially-outward direction and is located in the axially-middle portion of an outer circumferential portion. It should be noted that it is not necessary that the rotor hub 19 be made of a non-ferromagnetic material in order to make a magnetic shield portion 18c into a separate component of the rotor hub 19.

The magnetic shield plate 24, which has a circular shape and which is preferably made of a ferromagnetic material, is fitted to the exterior of the rotor hub 19. The magnetic shield plate 24 is fixed, for example by adhesives or other suitable material, to the lower side of the hard disk support portion 19d with the upper surface of the magnetic shield plate 24 being abutted against the bottom surface of the hard disk support portion 19d.

A convex portion 24a, which has a circular shape that has a center located at the axis of rotation of the rotor hub 19 and which protrudes downwardly, is provided on the radially-inward portion of the bottom side of magnetic shield plate 24.

Referring now to FIG. 9, the convex portion 24a has a substantially triangular cross section whose base is located adjacent to the magnetic shield plate 24. The bottom of the convex portion 24a abuts against the bounding portion that radially separates the north poles and the south poles on the upper surface of the rotor magnet 20. With this arrangement, the magnetic field of the rotor magnet 20 may be prevented from flowing into the magnetic shield portion 18c through the convex portion 18f. As a result, the increase in the power consumption caused by the massive flow of magnetic field from the rotor magnet 20 into the magnetic shield portion 18c may be avoided. Further, the rotor magnet 20 may be axially positioned with great accuracy.

In the above descriptions of the preferred embodiments of the present invention, the positional relationships, such as "upper" and "bottom," are used for illustrative purposes only and are not intended to limit the scope of the present invention.

In addition, the size, the quantity, the material, the shape, and the placement of members illustrated in the above descriptions are for illustrative purposes only and are not intended to limit the scope of the present invention. For example, the present invention may apply to the motors used for driving devices of recording media other than hard disks, outer rotor type spindle motor, and other suitable devices. It is not necessary that the number of magnetic poles in the rotor magnet 20 be eight.

The magnetization waveform in the radial direction of the rotor magnet 20 may be, for example, a rectangular waveform or a sinusoidal waveform. The bounding position that separates the north pole and the south pole in the radial direction may vary in response to the magnetization waveform. Therefore, the bounding position is not limited to the radially-middle portion of the rotor magnet 20.

The present invention may be applied to, but not limited to, small motors having the rotor magnet 20 whose height, inner radius, and outer radius are approximately 1 mm to 10 mm, preferably, approximately 1 mm to 5 mm, for example.

Moreover, when a circular rotor magnet 20 is used, the amount of the magnetic flux flowing into the stator 12 is reduced when the rotor magnet 20 is flat, i.e., when the axial height is twice or less than the radial thickness (the difference between the outer radius and the inner radius). The flatter the rotor magnet 20 is, the less the magnetic flux flows into the stator 12. As a result, the magnetic flux wrapping around increases relatively. For this reason, a flat circular rotor magnet 20 is especially preferable for the present invention.

In the present invention, the shape of the convex portion on the magnetic shield portion is not limited to the circular cone, radial ridge, and circular ridge shapes. However, it is preferred to minimize the abutting portion of the rotor magnet so as to minimize the magnetic flux flowing into the magnetic shield portion through the convex portion.

The examples described above relate to hard disk drive devices. However, the motor and the hard disk drive device of various preferred embodiments of the present invention may be applied to recording disks other than hard disks, such as optical disks and optical-magnetic disks. The scope of the present invention is not limited by whether the recording disk is exchangeable or not. For example, the recording disk support portion could be a turntable that is rotated by and is fixed axially to the motor of one of the preferred embodiments of the present invention.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A spindle motor comprising:
   a rotor magnet having a circular shape and including a plurality of pairs of magnetic poles polarized in a radial direction, the pairs of magnetic poles are arranged along a circumferential direction of the rotor magnet;
   a rotor hub having a circular surface, the rotor hub supports the rotor magnet and is rotatable around an axis of the circular shape of the rotor magnet;
   a stator including a circumferential surface radially opposing a circumferential surface of the rotor magnet; and
   a bearing rotatably supporting the rotor hub; wherein
   the circular surface opposes one axial end surface of the rotor magnet and has an abutting portion that abuts against the rotor magnet at or near a bounding portion of the magnetic poles;
   a gap extends in a radially-inward and radially outward directions from the abutting portion; and
   at least a portion of the rotor hub where the circular surface is provided is made of a ferromagnetic material.

2. A spindle motor comprising:
   a rotor magnet having a circular shape and including a plurality of pairs of magnetic poles polarized in a radial direction, the pairs of magnetic poles are arranged along a circumferential direction of the rotor magnet;
   a rotor hub having a circular surface, the rotor hub supports the rotor magnet and is rotatable around an axis of the circular shape of the rotor magnet;
   a stator including a circumferential surface radially opposing a circumferential surface of the rotor magnet; and
   a bearing radially supporting the rotor hub; wherein
   the circular surface opposes one axial end surface of the rotor magnet and has an abutting portion that abuts against the rotor magnet at or near a bounding portion between circumferentially adjacent pairs of magnetic poles;
   a gap extends in circumferential directions from the abutting portion; and
   at least a portion of the rotor hub where the circular surface is provided is made of a ferromagnetic material.

3. A spindle motor as set forth in claim 1, wherein:
   the circular surface includes a convex portion facing the one axial end surface of the rotor magnet; and
   the circular surface abuts against the rotor magnet at the convex portion.

4. A spindle motor as set forth in claim 2, wherein:
   the circular surface includes a convex portion facing the one axial end surface of the rotor magnet; and
   the circular surface abuts against the rotor magnet at the convex portion.

5. A spindle motor as set forth in claim 3, wherein the convex portion has a circular shape along the rotor magnet.

6. A spindle motor as set forth in claim 4, wherein the convex portion has a circular shape along the rotor magnet.

7. A spindle motor comprising:
   a rotor magnet having a circular shape and including a plurality of pairs of magnetic poles polarized in a radial direction, the pairs of magnetic poles are arranged along a circumferential direction of the rotor magnet;
   a rotor hub including a cylinder portion having an outer circumferential surface and including a magnetic shield portion composed of a ferromagnetic material and extending in a radial direction from the cylinder portion, the rotor hub coaxially supports the rotor magnet with the magnetic shield portion such that the rotor magnet can be rotated around an axis of an outer circumferential surface of the rotor magnet;
   a convex portion provided on a surface of the magnetic shield portion that abuts against the rotor magnet at an approximate bounding portion between pairs of magnetic poles on one axial end surface of the rotor magnet;
   a stator including a circumferential surface radially opposing a circumferential surface of the rotor magnet; and
   a bearing rotatably supporting the rotor hub.

8. A spindle motor comprising:
   a rotor magnet having a circular shape and including a plurality of pairs of magnetic poles polarized in a radial direction, the pairs of magnetic poles are arranged along a circumferential direction of the rotor magnet;
   a rotor hub including a cylinder portion having an outer circumferential surface and including a magnetic shield portion made of a ferromagnetic material and extending radially from the cylinder portion, the rotor hub coaxially supports the rotor magnet with the magnetic shield portion, and the rotor hub is rotatable;
   a convex portion provided on a surface of the magnetic shield portion abuts against the rotor magnet at an approximate center portion of the radial thickness of the rotor magnet;

a stator including a circumferential surface radially opposing a circumferential surface of the rotor magnet; and a bearing rotatably supporting the rotor hub.

9. A spindle motor as set forth in the claim 7, wherein the convex portion extends in the circumferential direction.

10. A spindle motor as set forth in the claim 7, wherein the convex portion extends in the radial direction.

11. A spindle motor as set forth in the claim 8, wherein the convex portion extends in the circumferential direction.

12. A spindle motor as set forth in claim 1, wherein an axial length of the rotor magnet is about twice or less than a radial thickness of the rotor magnet.

13. A spindle motor as set forth in claim 2, wherein an axial length of the rotor magnet is about twice or less than a radial thickness of the rotor magnet.

14. A spindle motor as set forth in claim 3, wherein an axial length of the rotor magnet is about twice or less than a radial thickness of the rotor magnet.

15. A spindle motor as set forth in claim 4, wherein an axial length of the rotor magnet is about twice or less than a radial thickness of the rotor magnet.

16. A spindle motor as set forth in claim 7, wherein an axial length of the rotor magnet is about twice or less than a radial thickness of the rotor magnet.

17. A spindle motor as set forth in claim 8, wherein an axial length of the rotor magnet is about twice or less than the radial thickness of the rotor magnet.

18. A spindle motor as set forth in claim 3, wherein a circumferential surface of the stator is located at a radially-inward position in relation to a circumferential surface of the rotor magnet.

19. A spindle motor as set forth in claim 4, wherein a circumferential surface of the stator is located at a radially-inward position in relation to a circumferential surface of the rotor magnet.

20. A spindle motor as set forth in claim 9, wherein a circumferential surface of the stator is located at a radially-inward position in relation to a circumferential surface of the rotor magnet.

21. A spindle motor as set forth in claim 10, wherein a circumferential surface of the stator is located at a radially-inward position in relation to a circumferential surface of the rotor magnet.

22. A spindle motor as set forth in claim 11, wherein a circumferential surface of the stator is located at a radially-inward position in relation to a circumferential surface of the rotor magnet.

23. A recording disk driving device, comprising:
a spindle motor as set forth in claim 1;
a recording disk supported by the rotor hub so as to be coaxially rotatable with the rotor hub;
a magnetic reading and/or writing head;
an arm supporting the magnetic reading and/or writing head;
an actuator for moving the magnetic reading and/or writing head and the arm in the radial direction; and
a case enclosing the spindle motor, the recording disk, the magnetic reading and/or writing head, the arm, and the actuator.

24. A recording disk driving device, comprising:
a spindle motor as set forth in claim 2;
a recording disk supported by the rotor hub so as to be coaxially rotatable with the rotor hub;
a magnetic reading and/or writing head;
an arm supporting the magnetic reading and/or writing head;
an actuator for moving the magnetic reading and/or writing head and the arm in the radial direction; and
a case enclosing the spindle motor, the recording disk, the magnetic reading and/or writing head, the arm, and the actuator.

* * * * *